United States Patent [19]
Parvulescu et al.

[11] Patent Number: 6,029,063
[45] Date of Patent: Feb. 22, 2000

[54] VOICE SCRATCHPAD IMPLEMENTED WITH WIRELESS TELEPHONE

[75] Inventors: Adrian Parvulescu, Fish's Eddy, N.Y.; Sophie Klym, Lincoln Park; Andrew Todd Zidel, Hawthorne, both of N.J.

[73] Assignees: Sony Corporation, Tokyo, Japan; Sony Corporation Electronics, Inc., Park Ridge, N.J.

[21] Appl. No.: 08/712,567

[22] Filed: Sep. 11, 1996

[51] Int. Cl.[7] .................................................. H04M 11/10
[52] U.S. Cl. .................... 455/412; 455/556; 455/575; 379/88.28
[58] Field of Search .................... 455/412, 553, 455/556, 575; 379/67.1, 88.28, 85; 369/69

[56] References Cited

U.S. PATENT DOCUMENTS

| | | | |
|---|---|---|---|
| 4,481,382 | 11/1984 | Villa-Real | 455/556 |
| 4,875,229 | 10/1989 | Palett et al. | 455/412 |
| 5,333,176 | 7/1994 | Burke et al. | 455/412 |
| 5,444,761 | 8/1995 | Nagashima | 455/556 |
| 5,568,538 | 10/1996 | Tamir et al. | 455/412 |
| 5,630,205 | 5/1997 | Ekelund | 455/412 |
| 5,737,394 | 4/1998 | Anderson et al. | 455/412 |
| 5,790,957 | 8/1998 | Heidari | 455/412 |

OTHER PUBLICATIONS

Service Manual SPP–A20 for Sony Cordless Telephone with Answering System—US Model, Canadian Model, E Model, Jan. 1992.

*Primary Examiner*—Willis R. Wolfe
*Attorney, Agent, or Firm*—Ronald P. Kananen; Rader, Fishman & Grauer

[57] ABSTRACT

A voice scratchpad implemented in a wireless telephone allows the user to record important information gathered during a phone conversation. The wireless telephone includes signal processing means and memory means for recording at least one message or memo which is spoken over the telephone. The telephone also includes controls for initiating the recording of such a memo and for retrieving and replaying the memo. Indexing may be included which allows the system to record and replay a plurality of memos. The user of the phone can thus record important information in a memo on the voice scratchpad without the need for paper or the concentration and effort required for writing.

20 Claims, 5 Drawing Sheets

Fig. 3

VOICE SCRATCHPAD IMPLEMENTED WITH WIRELESS TELEPHONE

FIELD OF THE INVENTION

The present invention relates to the field of wireless communications. More specifically, the present invention relates to a method and apparatus for taking notes with a voice scratchpad during a conversation on a wireless telephone.

BACKGROUND OF THE INVENTION

In recent years, wireless communications, such as high-tier cellular telephones and pagers, and low-tier personal access communications systems (PACS), have dramatically enhanced our ability to communicate. In both personal and professional life, these devices have made it more convenient and less time consuming for people to stay in touch with one another.

With wireless telephones in particular, people are now able to communicate from places where they would otherwise be unreachable. Wireless telephones also allow people to make use of time which would otherwise be wasted. For example, with a wireless telephone, time spent riding in a car, walking down the street, etc. can also be time spent conducting business, scheduling appointments or coordinating plans with family and friends.

Wireless telephones thus allow users to maximize the use of their time. However, to be truly valuable, the important information gathered during these phone calls such as names, phone numbers, appointments, commitments, etc. must be remembered or recorded so as to be available at a later time.

Because human memory is often short or unreliable, it is a common practice to keep a scratchpad of paper near an office or home phone for writing down important information gathered during phone calls. Unfortunately, keeping a scratchpad at hand while roaming with a wireless phone is much less convenient.

Moreover, wireless phones are often used at the same time the user is also engaged in some other activity, such as driving a car. Clearly, it may be dangerous or impossible to attempt to hold a cellular phone, write a message on a scratchpad and drive a car simultaneously. Writing on a paper scratchpad while also holding a telephone handset may require note-takers to use both hands for listening and note-taking and to place their eyes on the pad rather than the road or street where they are driving or walking.

Accordingly, to fully capitalize on the freedom and flexibility offered by wireless communications, there is a need for a method and apparatus for recording important information gathered during a wireless telephone call that does not require much attention or effort. More specifically, there is a need for a method and apparatus for recording important information gathered during a wireless telephone call that does not require the user to write on a paper scratchpad.

SUMMARY OF THE INVENTION

Accordingly, it is an object of the present invention to meet the above described needs and others.

It is an object of the present invention to provide a method and apparatus for recording important information gathered during a wireless telephone call which requires little attention or physical effort on the part of the user.

It is a further object of the present invention to provide a method and apparatus for recording important information gathered during a wireless telephone call which leaves the eyes and hands of the user essentially free for other tasks.

It is a further object of the present invention to provide a method and apparatus for recording important information gathered during a wireless telephone call which does not involve the use of a writing instrument and paper which may not be readily available when needed by the user.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may comprise:

a wireless phone handset which is used on a cellular or lower-tier radio network, an audio transducer located in the mouthpiece of the handset for generating a signal responsive to speech, signal processing means for processing the signal memory means disposed in the handset for recording the processed signal;

means for controlling when the memory means records the processed signal;

means for retrieving the recorded signal from the memory means;

a speaker for outputting said retrieved signal;

means for indexing and recording in said memory means a series of signals received over time from said transducer; and means for selecting and retrieving any one of said series of recorded signals.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Using the drawings, preferred embodiments of the present invention will now be explained.

Figure 5:
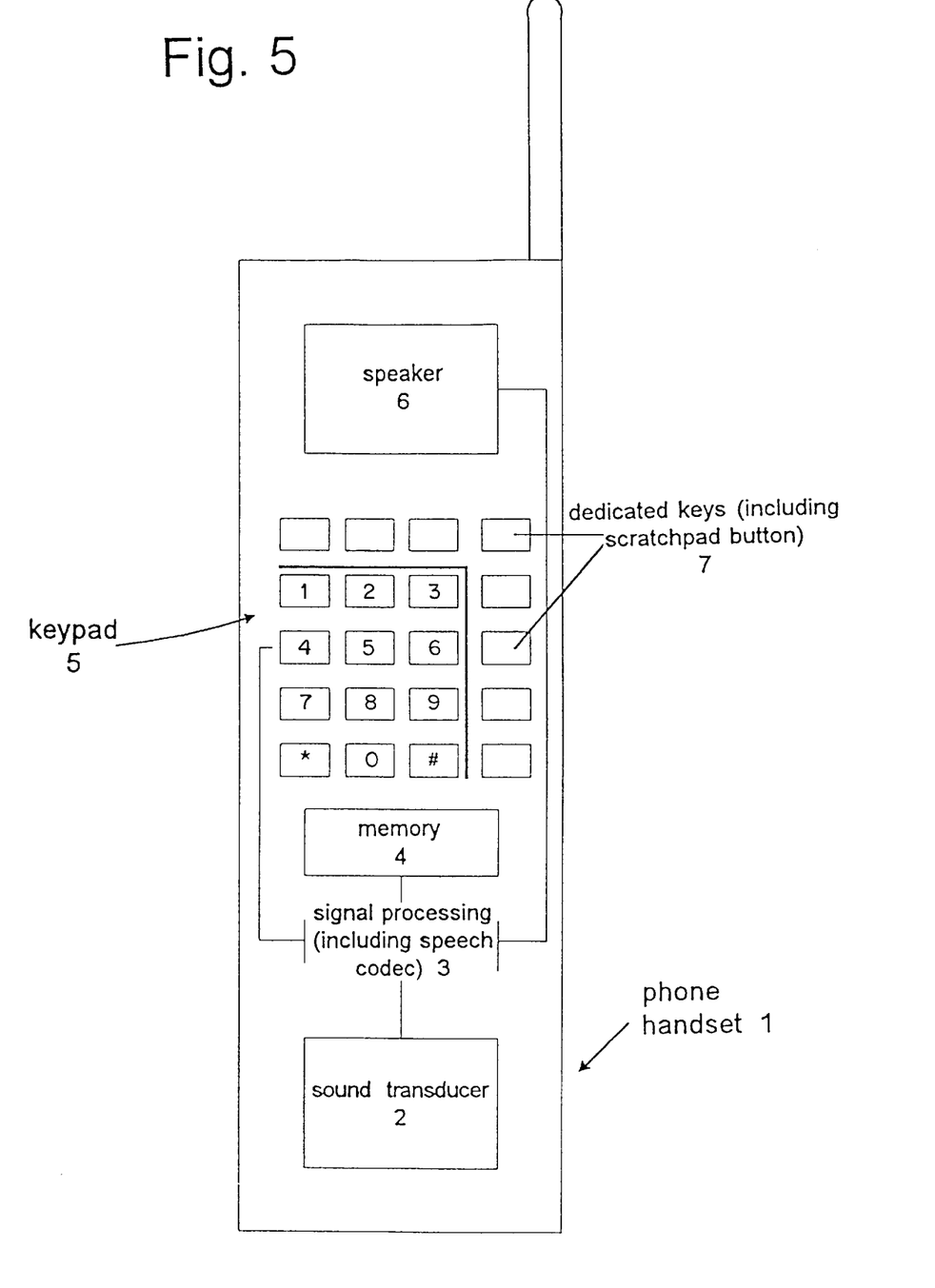
FIG. 5 is a block diagram showing the apparatus implementing the present invention.

FIG. 5 shows a block diagram of a wireless telephone handset 1 implementing the voice scratchpad of the present invention. The handset includes a sound transducer 2 which is located in the mouthpiece of the telephone handset 1. The sound transducer 2 is a microphone that converts sound into electric signals that can be recorded or transmitted to another telephone handset.

The electrical signal output by the sound transducer 2 must be processed by electronic circuitry 3 which, in a wireless phone, typically includes a speech codec. According to the present invention, the handset 1 also has an electronic memory 4 which is connected to the processing circuitry 3. This memory is used to store the memos recorded by the voice scratchpad system of the present invention and is preferably a solid state RAM chip.

The handset 1 also includes a keypad 5. The keypad 5 includes the standard telephone buttons (0 to 9, * and #), plus at least one additional dedicated button 7 which is the scratchpad button and is used to control the voice scratchpad of the present invention. The precise location of the scratchpad button in relation to other dedicated buttons is unimportant.

The handset 1 also includes a speaker 6 located in the earpiece of the handset. The speaker 6 allows the handset to convert electric signals into sound and thus playback a memo recorded on the voice scratchpad of the present invention or allow the handset user to listen to a phone call.

Figure 1:
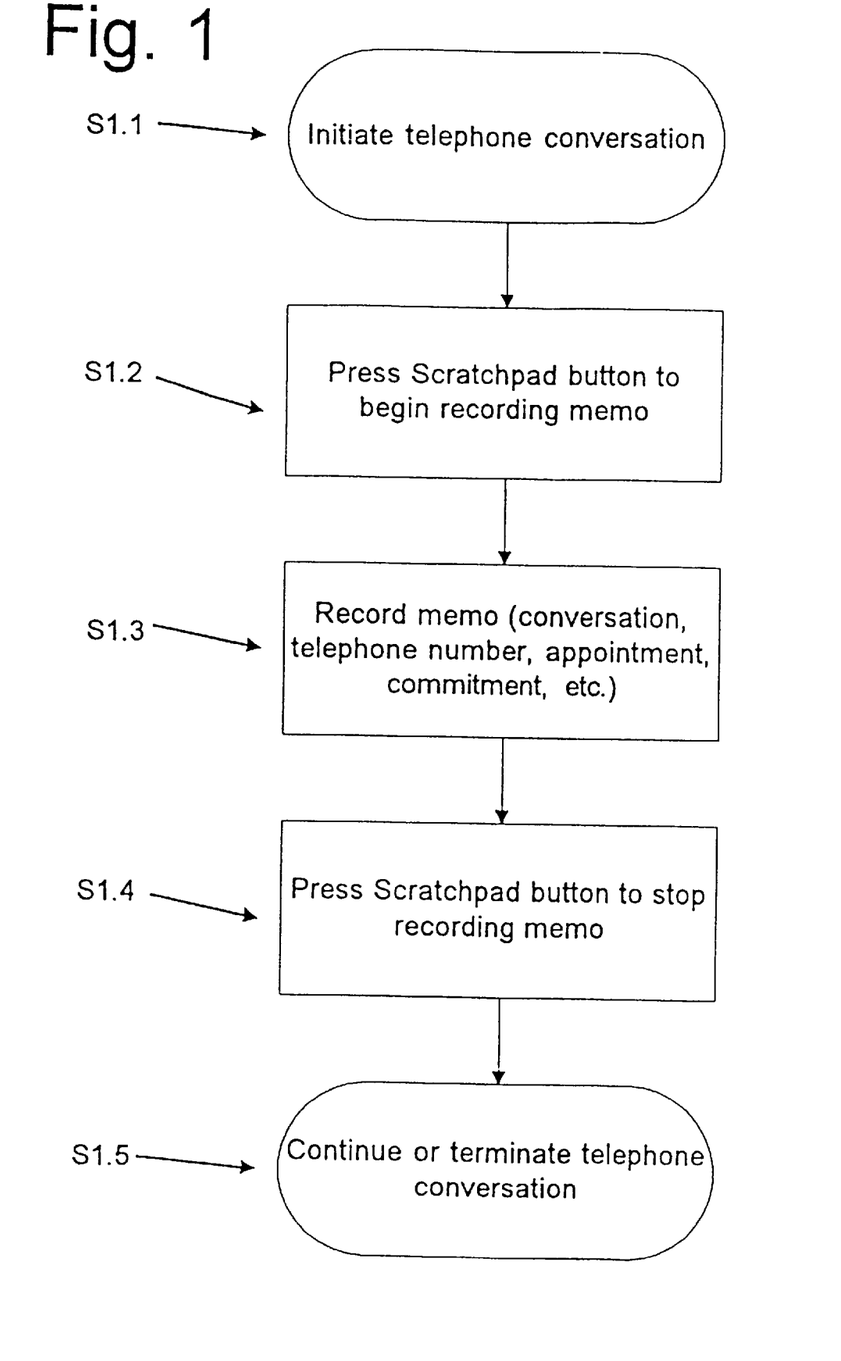
FIG. 1 is a flow chart showing the process for recording a memo on the voice scratchpad of the present invention during a telephone call.

FIG. 1 illustrates a process of using the voice scratchpad of the present invention. In step S1.1, the user of the wireless telephone handset which incorporates the present invention initiates a telephone conversation by either placing or receiving a telephone call.

In step S1.2, the user has gathered important information from the phone call and wishes to make a memo on the voice scratchpad to record the information. Accordingly, the user presses the dedicated scratchpad button provided on the keypad 5 of the handset 1. If the embodiment of the invention being used includes the capability to record a plurality of memos, step S1.2 may include providing a number or other indicator by which to identify the memo the user is about to record. Alternatively, the invention may simply assign a number in numerical order to the memos as they are recorded.

In step S1.3, the user records the memo by speaking the important information into the sound transducer 2 and the memo is recorded in memory 4. More specifically, the sound transducer 2 produces an electronic analog signal that represents the words spoken by the handset user. The signal produced by the transducer 2 can be converted back into sound by speaker 6 to reproduce the voice and words of the telephone user.

When the handset user is conducting a telephone conversation, the signal produced by the transducer is sent via radio waves (for wireless phones) or over phone lines (for conventional phones) to be reproduced by a speaker in the handset of the person to whom the user is speaking.

Before the signal produced by the transducer 2 can be transmitted via radio waves to the person to whom the handset user is speaking, or recorded in memory 4 as a memo, the analog signal must be converted into a digital signal. A speech codec (included in the processing circuitry 3 of FIG. 5) is an analog to digital converter typically provided in wireless phones to convert analog transducer signals to digital signals before transmission via radio waves.

Accordingly, the speech codec can be used to convert the analog transducer signal representing the memo into a digital signal for storage in memory 4. However, this use of the codec may interfere with the codec's function of converting transducer signals to be transmitted as phone conversation.

In an alternate embodiment, a separate analog to digital converter may be provided in handset 1 as part of processing circuitry 3 to avoid excessive demands on the codec. Such a converter would be dedicated to preparing voice scratchpad memos to be recorded in memory 4.

In a third alternative, a solid state integrated chip comprising memory and an analog to digital converter, such as the ISD2560, ISD2575 and ISD2590 chips made by Information Storage Devices, may be provided in the handset 1 to provide both the necessary memory and analog to digital processing.

In step S1.4, the user again presses the scratchpad button when he or she is finished recording the memo. At step S1.5, the user can then continue or terminate the telephone conversation.

The embodiment of FIG. 1 only contemplates the situation where a user wishes to make a memo during the course of a telephone conversation. It should be noted that the voice scratchpad of the present invention could be designed to allow the user to record a memo of important information at any time and not only during a phone call.

Figure 2:
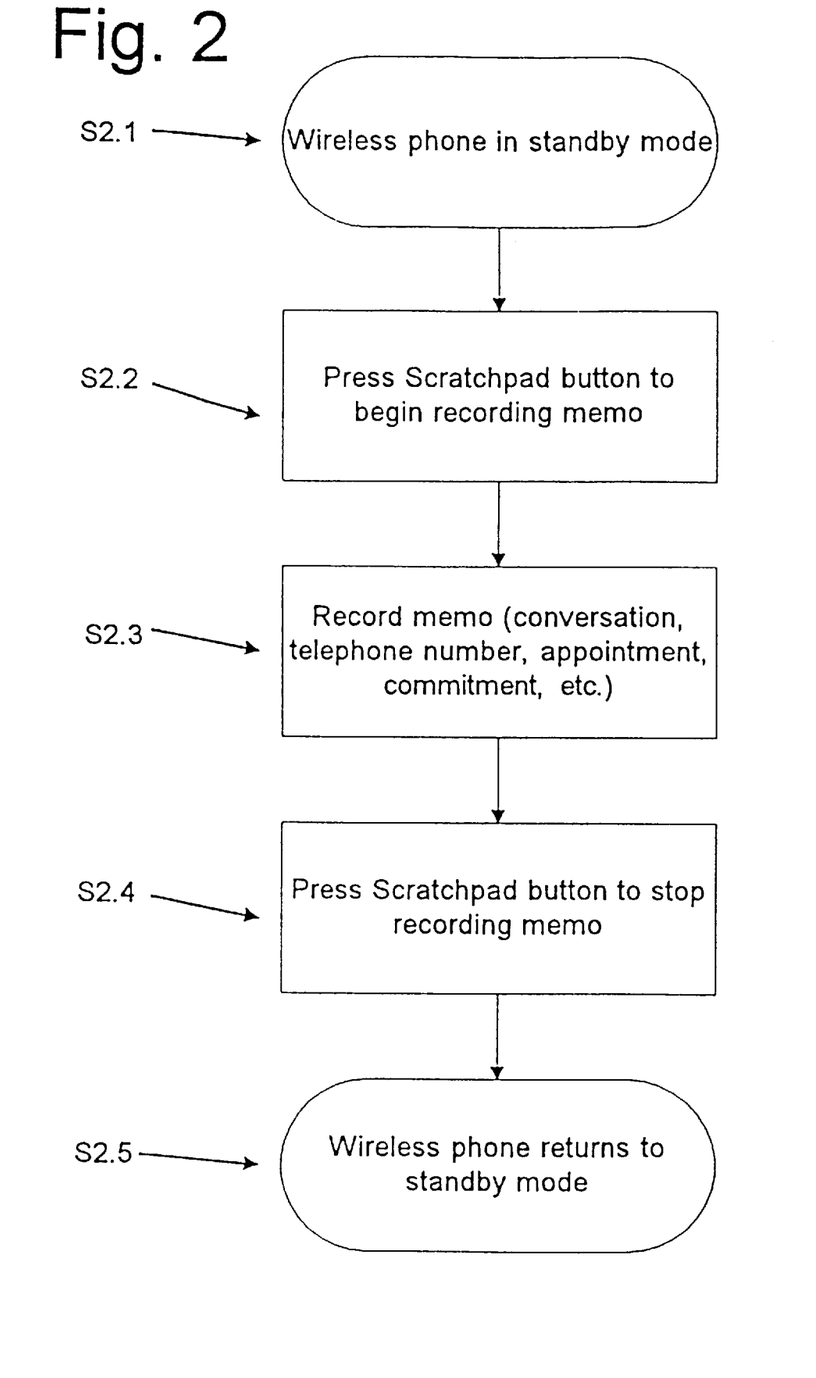
FIG. 2 is a flow chart showing the process for recording a memo on the voice scratchpad of the present invention when a telephone call is not in progress.

FIG. 2 illustrates the process for recording a memo according to the present invention which is identical to the process illustrated in FIG. 1 with the exception that a telephone call is not in progress.

In step S2.1, the wireless telephone is in standby mode, i.e. a telephone call is not in progress. The user of the telephone gathers important information or has an idea which he or she wishes to record.

In step S2.2, the user presses the scratchpad button to begin recording the memo. In step S2.3, the user speaks into the sound transducer 2, stating the information to be recorded.

When the user has finished, in step S2.4, the user again presses the scratchpad button to end recording. The wireless phone then returns to standby mode in step S2.5

Figure 3:
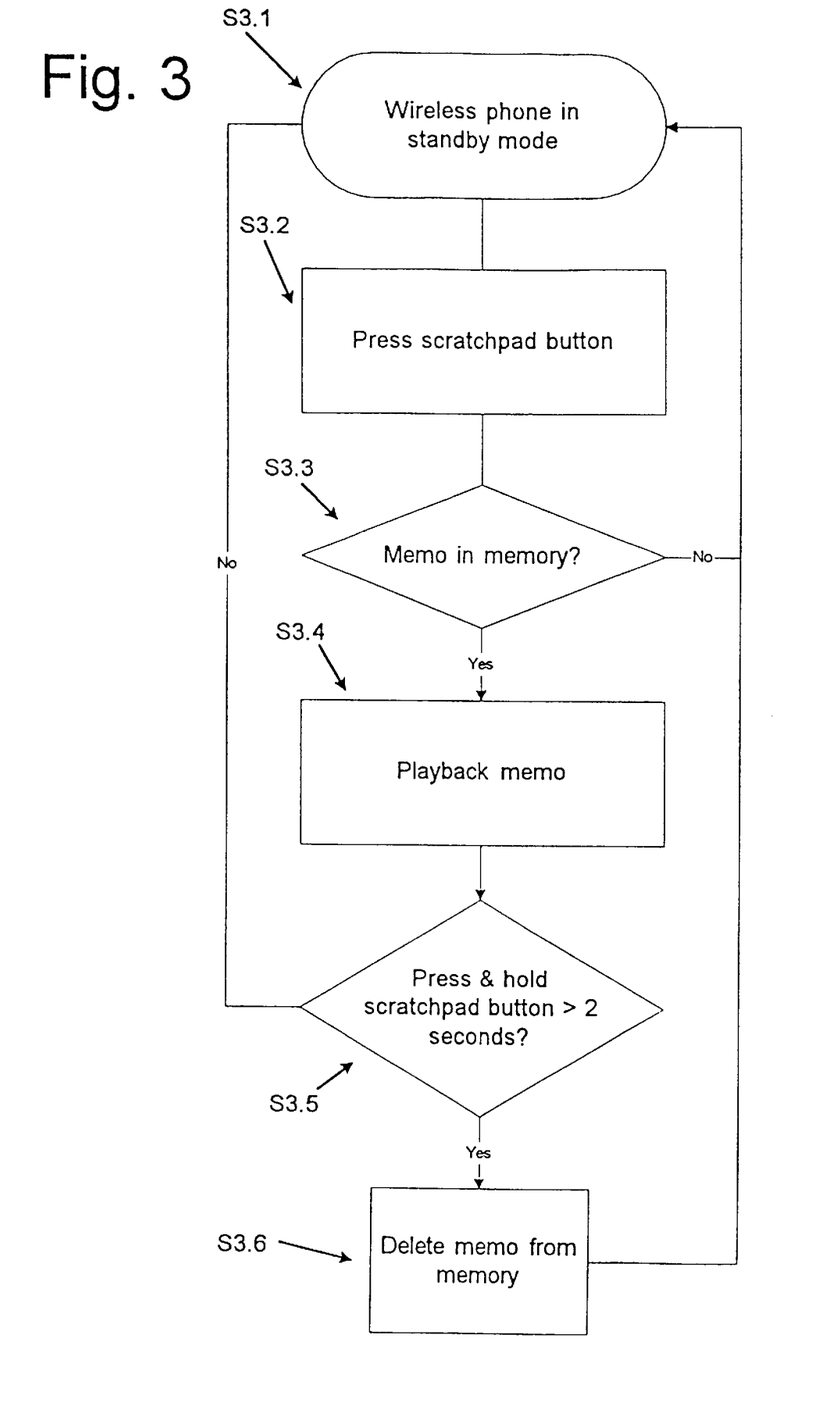
FIG. 3 is a flow chart showing the process for retrieving and playing back a memo on the voice scratchpad of the present invention.

FIG. 3 illustrates the process for retrieving a memo from a voice scratchpad that is configured to only record and store a single memo at any one time. In step S3.1, the wireless phone is in standby mode, i.e. a telephone call is not in progress.

At step S3.2, the user presses the scratchpad button. At step S3.3, the processing circuitry 3 determines whether there is a recorded memo to be retrieved. If not, the wireless phone returns to standby mode and step S3.1.

If a memo has been recorded, the memo is replayed for the user at step S3.4. When play-back has been completed, the processing circuitry 3 determines whether the user is pressing and holding the scratchpad key for more than a defined period of time, preferably 2 seconds.

If the user is not pressing the scratchpad key, the wireless phone returns to standby mode and step S3.1. If the user is holding down the scratchpad key for the defined period of time, the memo is deleted from memory 4 at step S3.6 before the wireless phone returns to standby mode at step S3.1.

Figure 4:
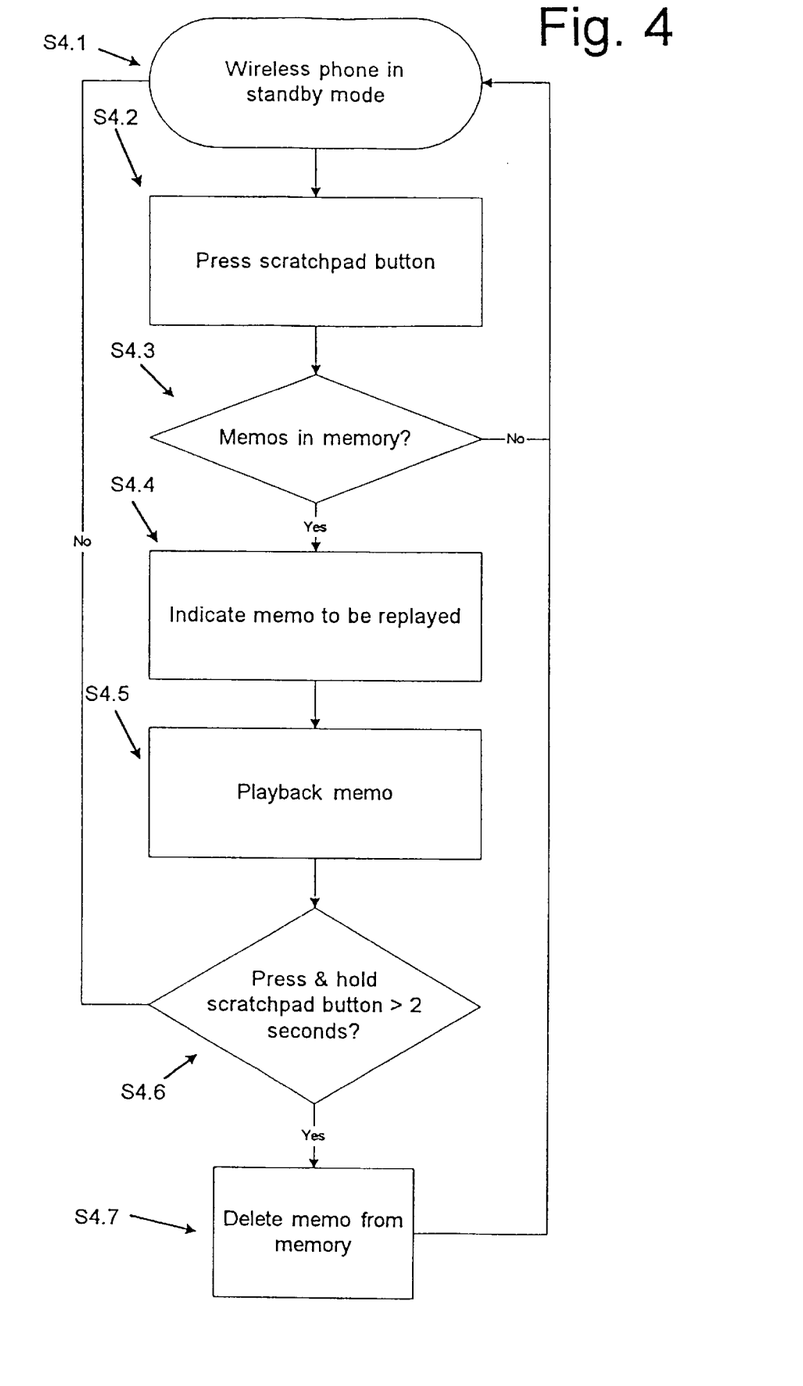
FIG. 4 is a flow chart showing the process for retrieving and playing back a memo on the voice scratchpad of the present invention when the scratchpad is configured to index and store a plurality of memos.

FIG. 4 illustrates the process of recalling a stored memo from the voice scratchpad of the present invention in an embodiment which is configured to index and store a plurality of memos.

At step S5.1, the wireless telephone is waiting in standby mode. No telephone call is in progress. At step S5.2, the user presses the scratchpad button.

At step S5.3, the processing circuitry 3 determines whether there are any recorded memos available for retrieval and playback. If not, the handset returns to standby mode at step S5.1.

If recorded memos are available, the user indicates which memo is to be recalled at step S5.4. The handset 1 may be configured to prompt the user for this information.

Once the user has indicated which memo is to be recalled, the indicated memo is retrieved and played at step S5.5. When play-back has been completed, the processing circuitry 3 determines whether the user presses and holds the scratchpad key for more than a defined period of time, preferably 2 seconds.

If the user is not pressing the scratchpad key, the wireless phone returns to standby mode and step S5.1. If the user is holding down the scratchpad key for the defined period of time, the memo is deleted from memory 4 at step S5.7 before the wireless phone returns to standby mode at step S5.1.

The embodiments illustrated in FIGS. 3 and 4 contemplate recalling and listening to memos during times when a telephone call is not in progress. It should also be noted that the voice scratchpad of the present invention could be configured to allow recall and playback recorded memos during a telephone conversation, including playing the memo so it is heard by all parties engaged in the phone call and not just the user of the handset 1 where the memo is recorded.

The invention could also comprise a feature for deleting recorded memos by indicating which memo is to be deleted without first listening to the memo and then holding down the scratchpad key. However, such an embodiment would likely require additional programming and dedicated key assignments.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system for recording an informational memorandum used with a wireless phone handset comprising:
   an audio transducer of said handset for generating an audio signal responsive to speech, said transducer being used to conduct wireless telephone conversations with said handset;
   a memory unit disposed in said handset for recording audio signals; and
   a user input device on said handset for selectively connecting said transducer and said memory unit so as to record said audio signal from said transducer in said memory unit;
   wherein said user input device only connects said memory unit and said transducer when said wireless telephone conversations are not in progress, and
   wherein said audio signal recorded in said memory unit can only be retrieved from said memory unit using said user input device on said handset.

2. A system as claimed in claim 1, further comprising a signal processor including a speech codec connected between said transducer and said memory unit.

3. A system as claimed in claim 1, wherein said memory unit comprises a solid state memory device.

4. A system as claimed in claim 1, further comprising a processor controlled by said user input device for deleting said recorded signal from said memory unit.

5. A system as claimed in claim 1, further comprising a processor controlled by said user input device for retrieving said recorded signal from said memory unit.

6. A system as claimed in claim 5, further comprising:
   a speaker on said handset for conducting said wireless telephone conversations, wherein said processor, under control of said user input device, selectively provides said retrieved signal to said speaker so that said signal is transduced into audible sound.

7. A system as claimed in claim 1, further comprising a processor connected to said memory unit and controlled by said user input device for indexing and recording in said memory unit a series of signals received over time from said transducer.

8. A system as claimed in claim 7, wherein said processor, under control of the user input device, selects and retrieves any one of said series of recorded signals.

9. A system as claimed in claim 8, wherein said processor further deletes said selected and retrieved signal under control of said user input device.

10. A method for recording an informational memorandum used with a wireless phone handset comprising:
    generating an audio signal responsive to speech with an audio transducer of said handset, said transducer being used to conduct wireless telephone conversations with said handset;
    recording audio signals in a memory unit disposed in said handset; and
    selectively connecting said transducer and said memory unit so as to record said audio signal from said transducer in said memory unit with a user input device on said handset;
    wherein said connecting is only performed when said wireless telephone conversations are not in progress, and
    wherein retrieving said audio signal recorded in said memory unit can only be performed using said user input device on said handset.

11. A method as claimed in claim 10, further comprising deleting said recorded signal from said memory unit with a processor controlled by said user input device.

12. A method as claimed in claim 10, further comprising deleting said recorded signal by holding down a dedicated button of said user input device for a predetermined period of time.

13. A method as claimed in claim 10, further comprising retrieving said recorded signal from said memory unit with a processor controlled by said user input device.

14. A method as claimed in claim 13, further comprising, with said processor, selectively providing said retrieved signal to a speaker of said handset so that said signal is transduced into audible sound.

15. A method as claimed in claim 13, further comprising deleting said recorded signal by holding down a dedicated button of said user input device for a predetermined period of time after said signal has been retrieved.

16. A method as claimed in claim 10, further comprising numbering and indexing a series of signals received over time from said transducer and recorded in said memory unit.

17. A method as claimed in claim 16, further comprising, with said processor under control of the user input device, selecting and retrieving any one of said series of recorded signals.

18. A system as claimed in claim 16, further comprising selecting and deleting any of said numbered signals from said memory unit.

19. A method as claimed in claim 16, further comprising:
   entering a number of a particular recorded signal with said user input device; and
   retrieving said particular recorded signal associated with said number.

20. A method as claimed in claim 19, further comprising deleting said particular recorded signal by holding down a dedicated button of said user input device for a predetermined period of time.

* * * * *

UNITED STATES PATENT AND TRADEMARK OFFICE
CERTIFICATE OF CORRECTION

PATENT NO. : 6,029,063
DATED : February 22, 2000
INVENTOR(S) : Adrian Parvulescu et al.

It is certified that error appears in the above-identified patent and that said Letters Patent is hereby corrected as shown below:

Cover Page, item [73], should read as follows;

[73] Assignees: Sony Corporation, Tokyo, Japan; Sony Electronics, Inc., Park Ridge, N.J.

Signed and Sealed this

Fifth Day of December, 2000

Attest:

Q. TODD DICKINSON

Attesting Officer

Director of Patents and Trademarks